United States Patent Office

3,425,930
Patented Feb. 4, 1969

3,425,930
OXIDATION OF WAXES IN THE PRESENCE OF AN ESTERIFYING AGENT AND REDUCTION OF OXIDIZED WAXES TO POLYHYDROXY-WAXES
Charles W. Ehrgott and Paul M. Kerschner, Trenton, N.J., assignors to Cities Service Oil Company, Bartlesville, Okla., a corporation of Delaware
No Drawing. Filed Oct. 20, 1965, Ser. No. 499,027
U.S. Cl. 208—27              9 Claims
Int. Cl. C10g 43/02

ABSTRACT OF THE DISCLOSURE

A process is disclosed for oxidizing hydrocarbon wax by agitating a molten wax charge with an esterifying agent, preferably an organic acid anhydride, while passing gaseous oxygen, usually at the rate of at least about 35 liters of oxygen per kilogram of wax per hour, over and in contact with the surface of the molten wax charge, whereby an oxy-wax having a high saponification number is obtained. Enhanced results are obtained when the esterifying agent is an alkanoic anhydride present in amounts at least about 500 grams per kilogram of wax. In another aspect the oxy-wax formed is subsequently reduced to form a polyhydroxy-wax having high hydroxyl number.

---

The present invention relates to the modification of hydrocarbon waxes. More particularly, the invention relates to a process for oxidizing hydrocarbon waxes to produce useful oxy-wax products. In a more specific aspect thereof, the invention provides a process for preparing polyhydroxylated wax products.

It is known that hydrocarbon wax may be oxidized by treatment with oxygen-containing gases, such as air. Heretofore, processes for oxidizing wax have comprised bubbling air through the wax maintained in a molten state. One major disadvantage attendant processes of this type is that foaming takes place as a result of bubbling the air through the molten wax. Efficient utilization of oxygen during the reaction is thereby inhibited and an oxy-wax product having a relatively low saponification number is obtained as product. Attempts to increase the saponification number of the oxy-wax, and thereby produce a product more suitable for subsequent conversion to a useful polyhydoxy-wax, by extending the duration of the oxidation process have not been generally successful, since dark products containing large amounts of resinification and degradation by-products result.

The present invention enables an improved process for oxidizing hydrocarbon wax whereby oxy-waxes having relatively high saponification numbers are obtained without the above-noted disadvantages attendant the prior art processes. The oxy-wax obtained from our process comprises a predominant amount of ester derivatives with smaller amounts of hydroxyl, carbonyl, and carboxyl groups. Typically, the saponification number of the oxy-wax product exceeds about 150 and may range as high as about 400 mg. KOH/gram of wax. Because of its high saponification number and other desirable characteristics, the oxy-wax is particularly suitable for use in manufacture of polyhydroxy-wax products. Thus, in a more specific aspect thereof, the invention provides an improved process for producing polyhydroxy-waxes useful, for example, in the manufacture of polyurethane foams, by oxidizing hydrocarbon wax to a saponification number of at least about 150 and subsequently converting the oxidized wax to a polyhydroxy-wax.

More particularly, in accordance with the present invention, a molten hydrocarbon wax charge is subjected to agitation and oxidized in the presence of an esterifying agent by passing gaseous oxygen over and in contact with the surface of the molten wax. Under the conditions of agitation employed, the oxygen introduced over the surface of the molten wax charge is drawn into the charge and uniformly dispersed therein. We have found that this method of contacting the wax charge with oxygen results in modified wax products having higher saponification numbers and also eliminates the foaming normally associated with the prior art methods of introducing gaseous oxygen under the surface of the wax charge while agitating at high speeds.

Among the hydrocarbon waxes which can be oxidized in accordance with the present invention are microcrystalline wax, paraffin wax, Fischer-Tropsch synthetic wax, polyethylene wax, etc. These waxes are well-known to the art and need not be described herein. Preferably the wax has a melting point below about 150° C. The paraffin waxes derived from petroleum and containing from about 18 to about 36 carbon atoms are particularly preferred starting materials.

As previously noted, the wax is placed in a molten state and subjected to agitation while gaseous oxygen is passed over and in contact with the surface thereof. While air is obviously preferred for this purpose, other gases may be employed including molecular oxygen itself or oxygen-enriched air. The rate at which oxygen is flowed over the molten wax surface is an important factor in producing higher saponification number wax products and accordingly should be at least about 35 liters of oxygen at S.T.P./hour/kg. of wax charge, preferably from about 40 to about 90 l./hour/kg.

While the oxygen is being passed over the surface of the molten wax charge, the charge is subjected to agitation sufficient to draw the gas into the charge mass. Thus, if the charge is not subjected to sufficient agitation to draw the gaseous oxygen through the charge, an insufficient amount of oxygen would be present for the oxidation reaction to take place. Besides drawing the oxidizing gas into the wax charge, the conditions of agitation employed herein enable maximum contact between the wax, gas and esterifing agent. It will be appreciated that it is not possible to precisely state the speed of agitation required for this purpose at such speeds will vary with the particular mixing equipment employed and other considerations. In general, speeds as low as about 1,000 r.p.m. or lower, depending on the mixing equipment, may be employed, although best results are usually obtained by operating the mixing apparatus at speeds in excess of 5,000 r.p.m., such as from 10,000 to 20,000 r.p.m.

We have found that conversion of the hydrocarbon wax to a high saponification number oxy-wax product in accordance with the invention is aided by carrying out the oxidation reaction in the presence of an esterifying agent. The esterifying agents may be weak inorganic or lower molecular weight aliphatic or aromatic organic acids or anhydrides thereof, including acetic anhydride, acetic acid, antimony pentoxide, phosphoric acid, propionic anhydride, butyric anhydride, phthalic anhydride, etc. The organic acid anhydrides are preferred due to the fact that water is not formed as a reaction by-product. Acetic anhydride is particularly outstanding in enabling the conversion of hydrocarbon wax to highly esterified products.

In the practice of the invention, the esterifying agent may be added to the wax charge batchwise prior to commencing introduction of the oxidizing gas, or continuously during the oxidation reaction. It is generally desirable to provide at least about 500 grams of esterifying agent per kilogram of wax charge being oxidized, and preferably at least about 700 grams per kilogram of wax charge. It is generally not necessary to employ greater than about 2,000 grams of esterfying agent per kilogram of wax charge, since further advantages are not obtained, although such greater amounts may be employed if desired.

The temperature, pressure and time conditions at which the oxidation reaction is carried out are subject to wide variation. Thus, the reaction temperature should be above the melting point of the wax and is preferably from about 160° C. to 190° C., a reaction temperature of 170° C. to 180° C. being particularly optimum. The reaction may be conveniently carried out at atmospheric pressure, although higher pressures may be employed if desired. Advantageously, the reaction is carried out until the saponification number of the wax reaches at least 150 (mg. KOH/gram of wax), and desirably at least 200. Accordingly, the reaction time may, under some circumstances, be as low as about one hour, but for optimum results is usually from four to fourteen hours.

The oxy-wax products of the invention are typically characterized by the following analysis:

|  | Mg. KOH/gm. |
|---|---|
| Saponification number | 150–400 |
| Hydroxyl number | 2–40 |
| Acid number | 10–40 |
| Carbonyl number | 60–150 |

As noted hereinbefore, the high saponification numbers possessed by the oxy-wax products render them exceptionally suitable for use in the manufacture of polyhydroxy-wax derivatives. Thus, in accordance with a specific aspect of the invention, the oxy-wax prepared as described above is partially reduced to convert substantially all of its oxy-functional groups to hydroxyl groups. The partial reduction may be carried out using any of the known techniques. One suitable method, for example, comprises dissolving the oxy-wax in dry ether (e.g. ethylether or tetrahydrofuran) and slowly adding the solution to a dry ether solution of lithium aluminum hydride with stirring. Alternatively, the oxy-wax may be subjected to hydrogenation at elevated pressures using a hydrogenation catalyst such as copper chromite or reduced nickel on kieselguhr.

The polyhydroxy-wax products are typically characterized by a hydroxyl number of from about 300 to about 600 and are useful in the manufacture of polyurethane foams, polycarbonates, polyesters and the like.

The invention will now be further described with reference to the following examples which are merely illustrative and are not intended to limit the scope of the invention.

EXAMPLE 1

A 500 cc., three-neck Morton flask equipped with a dropping funnel, air inlet tube, agitator ("Premier Laboratory Dispersator-Series 2,000") and doubly stacked condensers is charged with 0.155 kilograms of $C_{18}$–$C_{36}$ paraffin wax having a melting point of about 57° C. The wax mass is melted by heating to a temperature of 170° C. and agitated at the rate of 12,000 r.p.m. Air is blown over the surface of the molten, agitated wax charge at the rate of 320 liters/hr./kg. wax (approximately 64 l of oxygen/hr./kg. wax) and acetic anhydride is added to the charge through the dropping funnel at approximately 160 grams/hr./kg. wax. Introduction of air and acetic anhydride is continued for six (6) hours during which time the temperature is maintained at 165–175° C. Thereafter, acetic acid (one of the reaction products) and excess acetic anhydride are removed from the wax by distilling at 110° C. under reduced pressure.

The wax product is shown to be substantially completely oxidized by being 100% soluble in concentrated sulfuric acid. The oxy-wax analyzes as follows:

| Hydroxyl number | 4 |
|---|---|
| Acid number | 25 |
| Carbonyl number | 80 |
| Saponification number | 239 |

It will be noted that the oxidation process of the present invention results in a modified wax product having an exceptionally high saponification number. The following experiments are included to illustrate the advantages of the present invention compared to oxidation processes not utilizing an esterifying agent or the method of air introduction contemplated herein:

Comparative Experiment 1

When the above-described experiment is repeated, except that no acetic anhydride is present during the oxidation reaction, the oxy-wax product has a saponification number of only 116.

Comparative Experiment 2

When the above-described experiment is repeated, except that the air is introduced under the surface of the wax charge rather than above the surface thereof, the saponification number of the product is 189. Foaming is observed to take place during the reaction period.

The following example illustrates the use of phthalic anhydride as the esterifying agent:

EXAMPLE 2

Using the apparatus set-up of Example 1, 0.155 kg. of paraffin wax and 150 grams of phthalic anhydride are placed in the flask. The mixture is heated to a temperature of 180° C. and agitated at a speed of 12,000 r.p.m. Air is blown over the surface of the charge at a rate of 385 liters/hr./kg. wax (approx. 77 l of oxygen/hr./kg.). During the run, which lasts seven (7) hours, phthalic anhydride is added to the charge in 10 gram portions at the end of each hour.

The wax is about 80% oxidized and has a saponification number of 172 mg. KOH/g.

The following example illustrates the addition of all of the esterifying agent to the wax charge prior to initiation of the oxidation reaction:

EXAMPLE 3

A two-liter flask is charged with 0.40 kilograms of paraffin wax. After being placed in a molten state, the wax is agitated at a speed of 12,000 r.p.m. while 560 cc. of acetic anhydride are added thereto. Agitation and heating (165–180° C.) of the resultant mixture are continued for ten (10) hours, during which time air is blown over the surface of the charge at a rate of 250 liters/hr./kg. wax (approximately 50 l. oxygen/hr./kg.

The product is a light-colored, semi-solid at room temperature and is 100% soluble in concentrated sulfuric acid, indicating substantially complete oxidation. The saponification number is 337.

The following example illustrates the preparation of a polyhydroxy-wax.

EXAMPLE 4

A solution of 20 grams of the oxy-wax product of Example 3 in 100 ml. of dry ethyl ether is prepared and added dropwise to a stirred solution of 20 grams of lithium aluminum hydride in 120 ml. of ethyl ether contained in a 500 cc. 3-neck flask equipped with a reflux condenser. The contents of the flask are maintained under a nitrogen atmosphere. Dropwise addition of the oxy-wax solution takes 37 minutes, after which time the reaction is allowed to proceed under reflux (35° C.) for five (5) additional hours. Subsequently, water is slowly added to the flask to destroy the lithium aluminum hydride catalyst. Ethyl ether is then added and the mixture is stirred for fifteen (15) minutes. The aqueous layer is withdrawn from the reaction flask and extracted with benzene. The ether layer is combined with the benzene extract, and the resultant mixture is heated under vacuum to evaporate the solvents. A residue weighing 9.5 grams is collected. This residue is found by analysis to have a hydroxyl number of 463, and is useful, for example, in the manufacture of polyurethane foams.

While the invention has been described above with respect to certain preferred embodiments thereof, it will be understood by those skilled in the art that various modifications and changes may be made without departing from the spirit and scope of the invention as expressed in the appended claims.

Therefore we claim:

1. Process for oxidizing hydrocarbon wax which comprises agitating a molten wax charge with an esterifying agent in an amount of at least about 500 grams/kg. wax while passing gaseous oxygen over and in contact with the surface of the molten wax charge, said wax charge being subjected to agitation sufficient to draw said gaseous oxygen into the charge and uniformly disperse said gas therein, said oxygen passed over and in contact with the surface of the molten wax charge at a rate of at least about 35 liters of oxygen at S.T.P./hr./kg. of wax, whereby an oxy-wax having a high saponification number is obtained.

2. Process as in claim 1 wherein said esterifying agent is an organic acid anhydride.

3. Process as in claim 1 wherein said esterifying agent is acetic anhydride and said oxygen gas is air.

4. Process as in claim 1 wherein said hydrocarbon wax is paraffin wax containing from about 18 to about 36 carbon atoms.

5. Process as in claim 1 wherein said esterifying agent is contacted with the molten wax charge in an amount of from about 700 to about 2,000 grams/kg. wax, and said oxygen gas is passed over and in contact with the surface of the molten wax charge at a rate of from about 40 to about 90 liters of oxygen at S.T.P./hr./kg. of wax.

6. Process as in claim 1 wherein said oxidation reaction is carried out for a period of time sufficient to increase the saponification number of the hydrocarbon wax to at least about 150 mg. KOH/gm. wax.

7. Process as in claim 6 wherein the reaction time is from about 4 to about 14 hours.

8. Process as in claim 6 wherein the reaction is carried out at a temperature of from about 160° C. to about 190° C.

9. Process as in claim 6 wherein the oxidized wax is subsequently reduced to form a polyhydroxy-wax.

References Cited

UNITED STATES PATENTS

| | | | |
|---|---|---|---|
| 2,061,687 | 11/1936 | Wilkoff | 208—3 |
| 2,151,106 | 3/1939 | Hentrich et al. | 260—452 |
| 2,770,637 | 11/1956 | Mitchell et al. | 260—451 |
| 2,837,553 | 6/1958 | Ferris et al. | 208—20 |
| 2,960,519 | 11/1960 | Marr et al. | 208—24 |

DANIEL E. WYMAN, *Primary Examiner.*

PAUL E. KOHOPKA, *Assistant Examiner.*

U.S. Cl. X.R.

208—3, 21; 260—2.5, 28, 398, 451, 452, 475, 488